March 31, 1970     F. W. UMMINGER, JR     3,503,832

REPETITIVE UNIT SCULPTURING APPARATUS

Filed April 7, 1965     2 Sheets-Sheet 1

INVENTOR.
FREDERICK W. UMMINGER, JR.
BY
Marechal, Biebel, French & Bugg
ATTORNEYS March 31, 1970   F. W. UMMINGER, JR   3,503,832
REPETITIVE UNIT SCULPTURING APPARATUS
Filed April 7, 1965   2 Sheets-Sheet 2
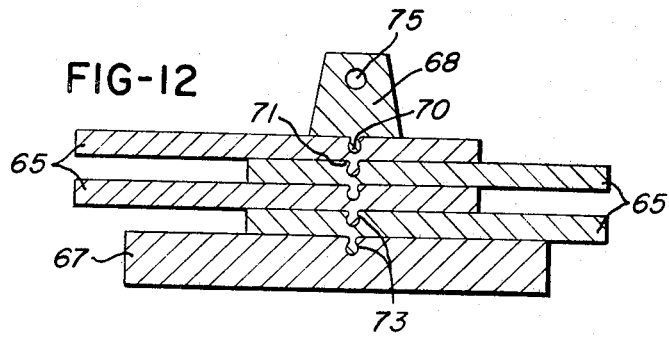
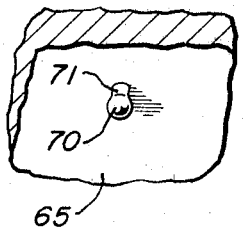
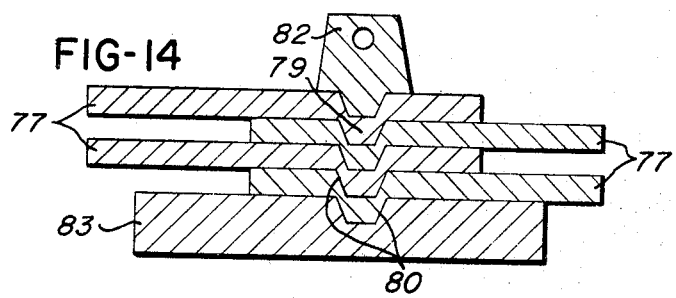
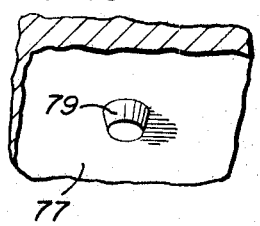
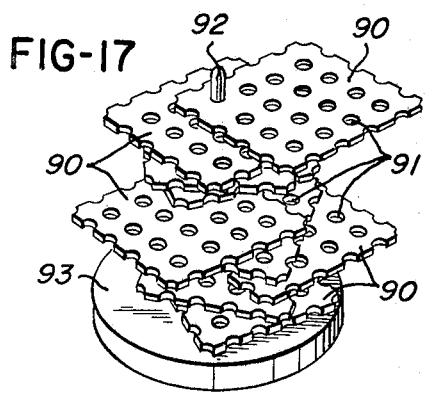
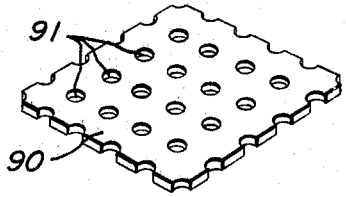
INVENTOR.
FREDERICK W. UMMINGER, JR.
BY
ATTORNEYS

United States Patent Office 3,503,832
Patented Mar. 31, 1970

3,503,832
REPETITIVE UNIT SCULPTURING APPARATUS
Frederick W. Umminger, Jr., Apt. 4FW, 334 E. 82nd St.,
New York, N.Y. 10028
Filed Apr. 7, 1965, Ser. No. 446,300
Int. Cl. B44c *3/06;* B44b *1/00*
U.S. Cl. 161—7    1 Claim

ABSTRACT OF THE DISCLOSURE

A sculptured figure includes a plurality of units of predetermined configuration and arranged in adjacent stacked relation. Each unit is freely rotatable relative to an adjacent unit on an axis eccentric to its geometric center to provide for creating a large variety of sculptured figures, and the units are retained in the stacked relation to provide for conveniently moving a created figure.

---

This invention relates to apparatus for producing sculptured figures, and more particularly to such apparatus comprising a series of related generally planar repetitive units adapted to be stacked and to be independently rotated in relation to adjacent similar units to produce sculptured figures having continuously variable external configurations, permitting selection of the resulting figure which the user considers most pleasing.

The apparatus is useful for producing a wide variety of three-dimensional abstract sculptured figures of continuously variable form. The user may select the particular arrangement of units which he finds produces the form he considers most interesting, appealing and pleasing in appearance. The resulting figure may be used alone as a pleasing decorative abstract piece, or may be adopted into an article of use such as a lamp base, flower holder, or the like. The invention has the advantage of providing for minute differences in the positional relationship of each successive unit to its adjacent unit, resulting in a high degree of precision in producing exactly the desired form. The units, furthermore, may be small or large and depending on their size, the apparatus is adapted to uses varying from household ornaments to relatively massive architectural structures.

A further use of the apparatus in accordance with the invention is for a model simulating an artistically designed structure, such as a building, memorial, or other architectural work so that the architect can experiment by moving the respective units in a large number of successive arrangement and then determine his design inexpensively, without actually constructing a scaled model.

When used directly to produce an artistically designed figure, the units may be left in freely movable positioned relationship with each other so that the configuration which they form may be changed from time to time, and it is possible also after the preferred external configuration of the figure is selected, to secure the selected configuration permanently by applying a suitable cement.

Accordingly, a primary object of the present invention is to provide novel sculpturing apparatus for producing figures wherein the exterior configuration of the figures are variable and flexible so that a variety of different pleasing contours and configurations may be obtained and varied at will.

As another object, the present invention provides apparatus for producing sculptured figures, as described above, which are defined by a series of closely spaced generally planar units rotatably mounted in relation to each other about a common axis.

Still another object of the present invention is to provide apparatus for producing an article having a variable external configuration defined by a series of successively spaced stacked units which cooperate with each other to generate a sculptured figure.

It is also an object of the present invention to provide sculpturing apparatus, as described above, wherein means are provided to connect the successively spaced units so that each unit is rotatable throughout 360 degrees in relation to an adjacently spaced unit.

It is also an object of the present invention to provide sculpturing apparatus for producing figures having an essentially infinite progression of variable external configurations, which includes a plurality of interchangeable units having the same shape adapted to be stacked and to produce a wide variety of geometrical configurations by rotating respective units with respect to each other in the stacked relationship of such units.

Other objects and advantages of the invention will be apparent from the following description, the accompanying drawings and the appended claim.

In the drawings—

FIG. 12 is another form of connecting the units in a successively arranged stacked relationship;

FIG. 13 is a perspective view of the connecting member as employed in the form of FIG. 12;

FIG. 14 is an elevational section view of a device having a series of stacked planar units, according to the invention, which are rotatably connected with a common axis of rotation in a manner which is non-interlocking to provide for simple rearranging of the units in a different stacked relationship in order to describe a different geometric figure;

FIG. 15 is a perspective view of the stub portion connecting member as employed in the apparatus shown in FIG. 14;

FIG. 16 is a perspective view of a planar unit having a plurality of holes providing for rotatable mounting in a variety of different relationships with adjacent units and/or with the axis; and FIG. 17 is a perspective view of a series of successively stacked units of the type shown in FIG. 16 which have been randomly mounted and rotated in relation to each other to produce an abstract geometric figure in accordance with the invention.

Figure 1:
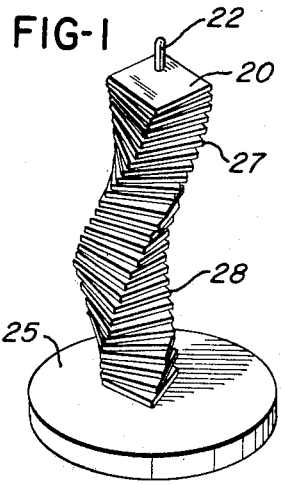
FIG. 1 is a perspective view of an illustrative device formed in accordance with the invention and showing an illustrative figure assembled from monoplanar units having an external configuration which can be varied to produce the desired overall appearance.
Figure 2:
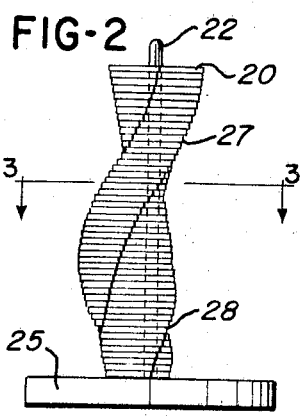
FIG. 2 is an elevational view of the device of FIG. 1 showing the stacked successive relationship of the generally square units which define the figures.
Figure 3:
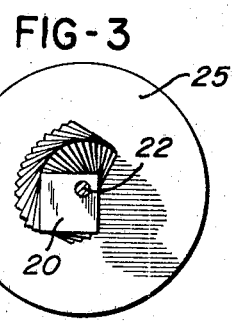
FIG. 3 is a top plan view of the device shown in FIGS. 1 and 2, showing generally the angular position of the units in relation to each other.

Referring to the drawings, which illustrate preferred embodiments of the invention, FIG. 1 shows apparatus describing an illustrative sculptured figure defined by a series of successively stacked planar units 20 which are rotatably spaced in relation to each other about an eccentrically positioned common axis provided by the post 22 extending upwardly from a base member 25. Each of the generally rectangular units 20 shown in FIG. 1 is identical in size and configuration and the units are so arranged that the corners describe smoothly flowing lines 27 and 28 (FIG. 2) so that the resulting figure has an overall uniform and smooth contour which is pleasing in appearance. It is to be understood, however, that all of the eccentrically mounted units 20 need not be rectangular, nor are they all required to be identical in size. It is within the scope of the invention that they may have different configuration and sizes, depending upon the overall configuration of the sculptural figure desired, and the artistic effect it is desired to produce.

Figure 4:
FIG. 4 is a perspective view of an illustrative monoplanar construction unit having a free-formed configuration, a plurality of which may be arranged in stacked relationship to generate a free-flowing and non-uniform geometric figure.
Figure 5:
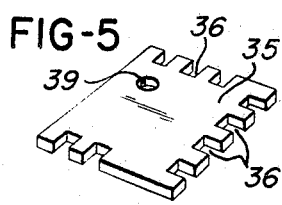
FIG. 5 is a perspective view of an illustrative monoplanar unit having a predetermined peripheral pattern formed therein.

The units of generally planar configuration shown in FIGS. 4 and 5 are intended as illustrative only of the many different unit forms which can be employed in the device according to the invention. Thus, the unit 33 shown in FIG. 4 illustrates a free-form planar design with no particular pattern. The unit 35 shown in FIG. 5 illustrates a definite geometrical planar figure having a generally rectangular shape and including peripheral notches 36. To provide for a wide variation in the external configuration of the resulting figure, the openings 38 and 39 formed within the units 33 and 35, respectively, for receiving the post 22, are eccentrically positioned within the construction units and thus permit each unit to be rotated about an off center axis.

Figure 6:
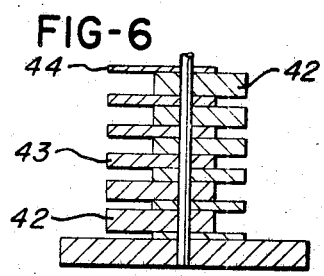
FIG. 6 is an elevational section view of an assembled apparatus illustrating a series of stacked monoplanar units of different thicknesses, included within the scope of the invention.
Figure 10:
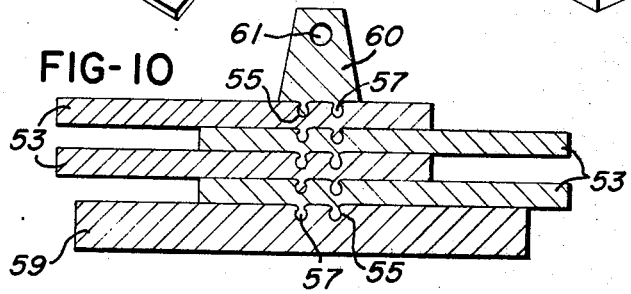
FIG. 10 is an elevational sectional view of a few units arranged in stacked relationship and showing a formed interlocking snap connection serving as the axial member between adjacent units whereby each unit may be rotated in relation to an adjacent unit but the units are prevented from separating during movement or handling of the described figure.

The invention accordingly provides a highly flexible apparatus for constructing a broad range of sculptured effects by reason of its employment of repetitive units. Individual units may be formed from any suitable material such as wood, stiff paper, plastic, glass or metal. The construction units may range through all stages of transparency, from clear to opaque. Individual units may all be of a single color or the respective units may collectively be in contrasting colors or proceed through a range of shades and colors. Similarly, all units may be of the same thickness, or construction units of different thicknesses may be intermingled, as illustrated by the units 42, 43 and 44 shown in FIG. 6. They may be rotated in a progressive series of almost infinitesimally angular differences between adjacent units providing softly flowing shapes such as are illustrated in FIG. 1, or with substantial and even abrupt differing angular positions of adjacent pieces to produce abrupt and rough effects such as are illustrated in FIGS. 10 and 17.

Further, while it is anticipated that the widest use of the invention is likely to be with units of relatively small scale for producing pleasing decorative abstract figures, it is apparent that the invention is not limited to such a scale. On the contrary, it may well be employed for such uses as forming stairways, memorials, interior or exterior columns of structures, interior or exterior walls of structures, and other uses the primary purpose of which is employment of an abstract formation attractive and pleasing to persons seeing it, provided only that the construction units are not so massive as to present undue difficulty in moving the units with respect to each other.

Figure 7:
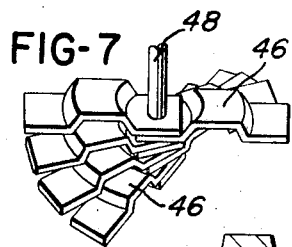
FIG. 7 is a perspective view of several successively spaced units having a preformed multiplanar configuration to illustrate another type of unit which can be used in apparatus according to the invention.

While the construction units thus far referred to are substantially flat or monoplanar, as shown in FIGS. 1 to 6, this is not necessarily the case. The units 46 shown in FIG. 7 for example, are illustrative of units having a predetermined multiplanar configuration in three dimensions giving a contoured shape to the unit, and units 47 shown in FIG. 8 produce a similar effect in curviplanar form.

Figure 8:
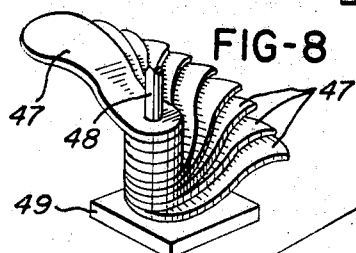
FIG. 8 is a perspective view of several successively spaced units illustrating a preformed curviplanar configuration.

As one means of supporting the units 46 and 47, a rod 48 extends through corresponding openings within the ends of the units 46 and is adapted to be supported from below, as for example, by base 49 as shown in FIG. 8, or suspended from overhead by a suitable cord when the resulting figure is suspended as a mobile (not shown).

Figure 9:
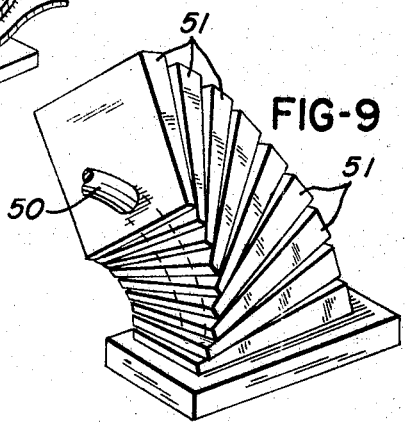
FIG. 9 is a perspective view of apparatus in accordance with the invention illustrating a series of successively arranged wedge-shaped units, each varying in thickness within itself by a constant increment and rotatably mounted on a flexible axis which can assume a variety of three-dimensional curves in response to the various positions of the units resulting from their rotation on the axis.

While FIGS. 1, 2, 6, 7 and 8 illustrate a generally straight and rigid axis of rotation for the unit pieces, it is within the scope of the invention to provide a means defining a common axis of rotation which may be pliable in order to assume various curved or spiral forms as illustrated by the pliable or flexible rod 50 (FIG. 9) which serves to support the stack of successively spaced wedge-shaped units 51 for independent relative rotation. By the use of a flexible curved or spiral axis of rotation for the units, as for example, a soft wire, it can be seen that quite a different kind of external configuration may be provided on the figures generated by the device according to the invention. Furthermore, by employing a pliable or flexible support rod 50, the wedge-shaped units 51 may be freely rotated while retaining contiguous faces in contact without any cracks or gaps. It is apparent also that, while the drawings illustrate various sculptured figures each formed by mounting units on a single axis, a series of figures each on its own axis could be assembled by use of a plurality of axes carried by a common base to create a more complex or an extended series of sculptured figures. Such figures could be used, for example, to construct decorative interior and exterior architectural walls or screens for buildings, patios, and other structures.

Figure 11:
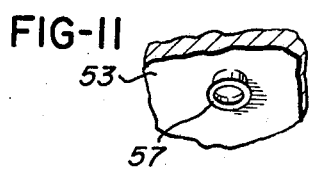
FIG. 11 is a perspective view of the formed snap-type interlocking connection as used between the units of the device shown in FIG. 10.

It may in many instances be desirable to interlock the respective successively spaced units to provide for separation between any two successive units for adding or removing units. Additionally, it is desirable to be able to move the completed figure without disassembling the units while nevertheless providing for full 360 degree rotation of each unit in relation to adjacent units. For this purpose, an interlocking socket arrangement as shown in FIGS. 10 and 11 may be employed, wherein the units 53 have an annular groove 55 formed within the top surface. This groove 55 is adapted to receive releasably an annular bead 57 projecting from the bottom surface of the above adjacent unit. Similarly, the base 59 and support member 60 are provided with a groove 55 and bead 57, respectively, so that the entire assembly can be snapped together for supporting the figure from above through the opening 61, as a mobile, or for moving the figure without separation between the units 53. In a form of this type, the units 53 preferably are molded from a suitable plastic which permits the annular bead 57 to be formed as an integral part of the unit 53.

Another construction for interlocking the units together to define a unitary figure is shown in FIGS. 12 and 13, wherein units 65, base 67 and support member 68 are provided with corresponding round bottom projections 70 having a slight annular undercut 71 which are adapted to be received within corresponding socket-type recesses 73 formed within the top side of the units 65 and base 67. In the same manner as the interlocking connection described above, this form of socket connection enables each unit 65 to be rotated in relation to adjacent units and likewise permits the units 65 to be easily separated when it is desirable to add or remove a unit or to disassemble the figure. The opening 75 provided in the supporting member serves the same purpose as the opening 61 (FIG. 10), that is, to enable the resulting figure described by the units 65 to be supported from above as a mobile. It is to be understood, of course, that while, for purposes of illustration, only four units 65 are shown in FIG. 12 and only four units 53 are shown in FIG. 10, the apparatus in practice may and for preferred artistic effects normally will include considerably more than four units as shown, for example, in FIG. 1. Furthermore, the base 67 may be eliminated when it is desired to suspend the resulting figure from overhead by a support member such as members 60 or 68.

For some applications of the apparatus as, for example, the construction of an assimilated figure of a structure such as a building or part of one, a monument or the like, it may be desirable to be able to separate the construction units quickly so as to rearrange the order in which they are stacked or to add, remove or substitute units having a different configuration or different proportional size in order to arrive quickly at a different external configuration. For this purpose, an interlocking arrangement between the units may not be desirable, in which case, the units 77 (FIG. 14) may be nested together by corresponding frustoconical shaped projections 79 and openings 80 formed respectively within the units 77, as shown in FIG. 14, permit each unit 77 to be rotated throughout 360 degrees in relation to an adjacent unit. It is this independent rotation of the unis which must be provided in a device according to the invention for continuously changing the external configuration in an essentially continuous progression to produce a large variety of easily attained sculptured configurations from which a preferred figure can be chosen by comparison with other figures. Once this figure has been chosen, and it is desired to retain the precise configuration, the units may then be cemented together to form a rigid unitized figure.

It is further considered within the scope of the invention to provide apparatus wherein the respective construction units may be rotatably mounted about an eccentric axis at varying different positions with respect to their peripheries to permit the selection of a common axis from a variety of possible common axes upon which the units can be uniformly mounted to produce artistic effects having either relatively smooth changes between the peripheries of adjacent construction units or relatively abrupt changes between the position of the peripheries of adjacent construction units.

For example, as shown in FIGS. 16 and 17, the units 90 may be formed from material having a series of perforations 91 spaced from each other as occurs in a suitable pegboard material. In such an embodiment the units 90 may be so placed on post 92 supported in base 93 in a randomly positioned relation, as illustrated schematically by the figure shown in FIG. 17. Here the units are rotatably mounted through respective perforations 91 differing substantially in the distance of the particular perforation from the edge of its unit, so that when the units 90 are rotated they will produce rapidly changing and rather sharply different angular relationships from each other.

It can be seen from the above description that apparatus according to the invention may be used for generating or for sculpturing a wide variety of figures. By providing the independent rotatable mounting of each of the construction units eccentrically with respect to commonly aligned supporting means, each of the figures will have a variable external configuration which can be easily altered in a continuous progression for arriving at the figure having the most pleasing overall design. According to one embodiment, the apparatus provides for a quick and simple adding, removing or exchange of construction pieces when it is desired to modify substantially the exterior configuration.

The apparatus also provides for the units to be connected in a supported or interlocking manner so that the particular figure can be moved about without disturbing the spaced relationships of the respective construction pieces. However, when it is desired to adjust the angular relationships among the units, the interlocking connection is adapted to permit such relative movement. Furthermore, since the units are placed on the axis, mounted eccentrically of their respective geometric centers for rotation, the invention provides for extensive variation in the exterior configurations of the resulting sculptured figures.

While the forms of apparatus herein described constitute preferred embodiments of the invention, it is to be understood that the invention is not limited to these precise forms of apparatus, and that changes may be made therein without departing from the scope of the invention, which is defined in the appended claim.

What is claimed is:

1. Apparatus for producing a sculptured figure having a variable exterior configuration, comprising a plurality of units having the same shape and arranged in a stacked relationship, means defining an interfitting and snap interlocking socket connection between adjacent said units and positioned eccentrically to the geometric centers of said units, each said connection providing for 360 degree rotation of each said unit relative to an adjacent said unit for obtaining a large variety of sculptured configurations from which a preferred figure can be selected by comparison with other figures, and means connected only to an outer said unit to provide for conveniently moving said figure without disturbing the selected relationship of said units.

References Cited

UNITED STATES PATENTS

| 214,022 | 4/1879 | Card | 52—183 |
|---|---|---|---|
| 1,094,155 | 4/1914 | Lehr | 35—28 XR |
| 1,472,536 | 10/1923 | Thomson | 35—69 |
| 2,877,506 | 3/1959 | Almoslino | 35—69 XR |
| 2,981,009 | 4/1961 | Lindquist | 35—69 XR |
| 3,222,072 | 12/1965 | Dreyer | 35—72 XR |
| 3,302,311 | 2/1967 | Israel. | |
| 1,009,468 | 11/1911 | Burrowes. | |
| 2,041,481 | 5/1936 | Otar. | |
| 2,428,972 | 10/1947 | Jackler et al. | |
| 2,732,646 | 1/1956 | James | 161—16 XR |

ROBERT F. BURNETT, Primary Examiner

WILLIAM A. POWELL, Assistant Examiner

U.S. Cl. X.R.

52—183; 156—63